Inventors:
William J. Diamond
Ralph E. Wallenbrock
Elmer B. Derr
Paul O. Pippel
Atty.

United States Patent Office 2,792,959
Patented May 21, 1957

2,792,959

PLASTIC BREAKER STRIP CONSTRUCTION

William J. Diamond and Ralph Eugene Wallenbrock, Evansville, Ind., and Elmer B. Derr, Oak Park, Ill., assignors, by mesne assignments, to Whirlpool-Seeger Corporation, a corporation of Delaware Application September 28, 1953, Serial No. 382,825

1 Claim. (Cl. 220—15)

This invention relates to an improvement in refrigerator cabinets, but more particularly to a breaker strip construction for sealing around an access opening in a cabinet of this character, to the material incorporated therein, and to the method of fabricating said breaker strip.

The principal object of this invention is to provide a novel and improved breaker strip construction adapted for positioning between the inner and outer wall members of a refrigerator cabinet.

Another principal object is to provide a breaker strip construction that incorporates a sealing and bonding medium therein and which medium is formed from a plastic material that may be either cold or hot molded in place between the inner and outer wall members of a refrigerator cabinet.

A further object is to provide a breaker strip construction wherein a layer of decorative material is interposed between a rigid supporting base member and a transparent sealing and covering material.

A still further object is to provide an improved means for affixing and sealing a breaker strip assembly in place between the inner and outer wall members of a refrigerator cabinet.

Another object is to provide a breaker strip assembly having preformed rail-like edging members that overlie the turned back marginal edges of the inner and outer wall members of a refrigerator cabinet and between which the assembly is securely positioned.

An important object is to provide a new composition of matter formulated with an epoxy resin, which composition of matter may be cold molded and which is particularly suitable for use in refrigerator cabinet breaker strip constructions.

A further important object is to provide a new composition of matter formulated from an exothermic resinous product combined with suitable hardeners or reactants and fillers, which composition is particularly suitable for use in breaker strip constructions and which, furthermore, may be cold molded in place without the aid of external pressure.

Another important object is to provide a new low-heat conducting sealing and covering composition which results from a blending of an epoxy resin with hardener and extender compounds.

A still further important object is to provide an improved method for fabricating breaker strip constructions, and particularly a moisture sealing composition or layer of material incorporated therein.

The above objects and others, which will be apparent from the description to follow, are accomplished by constructions such as illustrated in the accompanying drawings in which.

Figure 1:
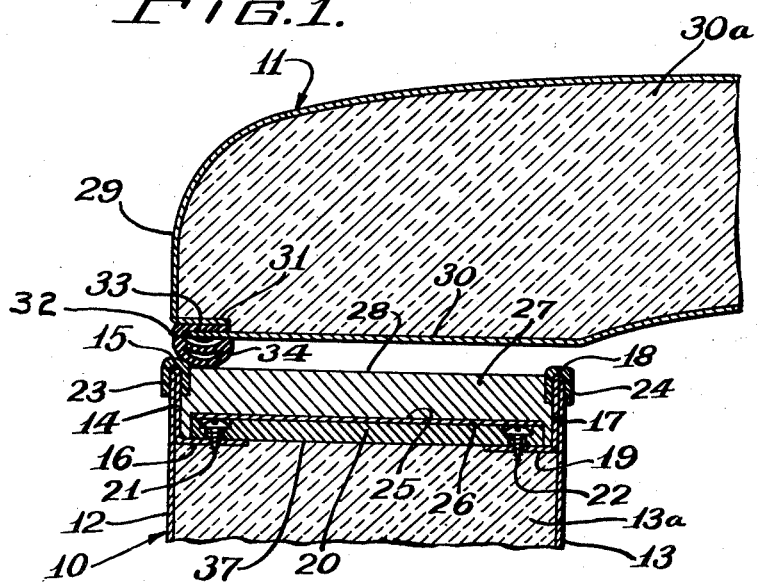
Fig. 1 is a section through a refrigerator cabinet showing a door or cover and an adjacent section of a cabinet wall wherein the proposed breaker strip construction has been incorporated.

In the drawings, a refrigerator cabinet indicated in its entirety by the reference character 10 is provided with a closure in the form of a lid or door indicated generally by the numeral 11 and, as illustrated, each wall of said cabinet includes an outer shell member 12, an inner liner member 13 and heat insulating material 13a therebetween. The outer shell 12 has a portion 14 proximate the marginal edge thereof that is bent back upon itself to form a double thickness member having a smooth rounded upper edge 15, while the lower end of said portion 14 is bent at right angles to form a flange 16. The inner liner 13 is similarly but complementally fashioned with a downwardly bent portion 17 lying in contact with the upper portion of said liner to provide a smooth rounded upper edge 18, while a right angled extension flange 19 integrally formed with the portion 17 projects inwardly in alignment with opposed flange 16 on shell 12. A base supporting member 20, preferably, of a rigid material having good heat insulating qualities and substantial mechanical strength, such, for instance, as compressed fiber board, pressed wood, or plastic sheeting, is positioned with opposite edges thereof, respectively, resting on the shelf-like flanges 16 and 19. A securing element in the form of a self-tapping screw 21 may extend through an opening in the support 20 and be threaded into an opening in the flange 16 to fixedly position one edge of said support member on said flange. A second similar securing member 22 may be fitted through a corresponding opening in the opposite edge of the support 20 and be threaded into an opening in the flange 19 to fixedly secure said opposite edge to the latter flange. If desired, of course, the openings in the member 20 may be countersunk, as illustrated, in order to position the heads of the screws below the upper surface thereof. A plurality of securing elements 21 and 22 may be disposed at spaced intervals along the edges of said base supporting member so that said base may be affixed at a plurality of points therealong.

The supporting base member 20 is dimensioned, preferably, so that the opposite end edges thereof are slightly spaced from the bent-back portions 14 and 17, respectively, of the wall members 12 and 13, for a purpose which will presently be understood.

The upper rounded edges 15 and 18, respectively, of the wall members 12 and 13, are covered with molding-like, rail or edging members 23 and 24 that extend, preferably, around the entire perimeter of the access opening of the refrigerator cabinet. Each of these rail-like molding members is fashioned, preferably, as a preformed U-shaped channel dimensioned so that the opening or mouth of the U tightly engages the opposite faces of the respective cabinet wall member over which said member is positioned. Such channel members may be fashioned as molded or extruded pieces of a suitable flexible plastic material, or, if desired, they may be molded of rubber or the like. It is understood, of course, that each such member may be fabricated as a single continuous member that extends entirely around the perimeter of the cabinet access opening, or it may be formed in shorter lengths and joined together at the cabinet corners or at some other equally suitable location. Furthermore, such members may be colored or otherwise decorated to harmonize with other components of the refrigerator cabinet with which they may be associated.

On the upper surface 25, of said base member 20, there may, if desired, be positioned a pigmented decorative material, such as indicated by the reference character 26.

which may be secured to said surface by any suitable well known adhesive, or, if preferred, such material may be merely positioned upon said surface without any adhesive and fixedly retained in position thereupon by an additional layer of another material as will be subsequently described. The pigmented decorative material, when used, is primarily provided for its esthetic appeal and thus may contain decorative patterns or designs or merely non-embellished colored surfaces in accordance with the desires of the user. Although any suitable material that presents the surface, coloring or pattern design desired may be used, all of the following compositions have been found to be satisfactory for the purpose: Colored or textured aluminum sheet or foil, or any other metal foil; paper of any weight or color, with or without patterns or designs; resin coated paper; cloth or any other woven material; any woven material not resin coated, such as cloth or saran; or any plastic sheet. The decorative material 26, preferably, is dimensioned so that its width coincides with that of the base member 20 and thus its edges extend flush with the edges of said member and additionally are in substantial vertical alignment with the inner faces of the respective edge molding members 23 and 24.

Now in accordance with the specific teachings of the present invention a covering and sealing material, represented generally by the reference character 27, is molded in place in the space above the rigid member 20 and between the inner and outer cabinet wall members 12 and 13. The sealing or bonding and covering material proposed is applied in the liquid state, and because of this fluidity readily flows into the limited spaces between the opposite end edges of said base member 20 and adjacent cabinet wall members 12 and 13, and upon hardening tightly adheres to all adjacent contacting surfaces to thereby seal off the insulation space between said wall members and prevent the entrance of moisture into the wall. This layer of sealing material will, of course, also function to confine and fixedly retain in position any decorative material, such as indicated at 26, particularly when such material is applied without a separate adhesive. If desired, of course, the decorative material may be eliminated, but, if coloring is essential or otherwise desirable, it may be incorporated instead in the sealing and covering material 27. Although, for appearance purposes, it is preferred that the top or upper surface of said sealing and covering layer be depressed slightly below the top surface of the edge molding members 23 and 24, as indicated in the illustrative embodiments herein, it may, if desired, be carried up flush with said surfaces without deviating from the spirit or teaching of the present invention.

The sealing and covering material employed, and the method of incorporating and utilizing it in the proposed construction, constitutes a very important part of the present invention and the selection thereof, accordingly, is highly critical to the proper practice of the invention. For instance, said material should, preferably, be clear and transparent so as to effectively employ the previously mentioned interposed layer of decorative material, when such is provided, or, in lieu thereof, be adaptable for incorporating therein a coloring pigment which will aid in harmonizing said material with a particular color scheme. It should have superior adhesion to metal qualities in order to provide a thoroughly effective moisture seal for the insulation space, and, of course, it must have good heat insulating properties so as to provide an efficient thermal break between the inner and outer cabinet wall members. Since said material, according to the concepts of the present invention, may be poured or molded in place without the aid of external heat or pressure for hardening or curing it is essential that it be sufficiently fluid to flow readily at room temperatures, require no preforming when molded into an irregular shape, and that it have dimensional stability by way of relatively low shrinkage characteristics. Furthermore, it should be tough and have substantial mechanical strength so as to withstand the wear and abuse that breaker strip constructions frequently encounter during their use. In addition, it is most desirable that such material be insoluble and infusible so as not to be readily stained, marred or otherwise injured upon contact with many different foodstuffs. Finally, it is most desirable that it be relatively low in cost of construction and be easy of assembly.

Compositions possessing all of the aforementioned properties, believed essential for the novel and improved sealing and covering material of the present invention, have been produced for the purpose by utilizing a mixture of commercially available resins, hardeners, fillers, and, when desired, coloring pigments or dyes. The resins found to be most suitable for the purpose come from the group of thermosetting casting resins having a cure shrinkage of less than 2% either as a pure resin or as a filled material, while the specifically preferred compounds of this group are included within the various types of polyepoxide resins such, for example, as: the product of reaction of epichlorohydrin and bis-phenol in alkaline solution catalyzed with amine and other alkaline catalysts; the product of reaction of a diglycidyl ether with amines; a product of reaction of polyesters with peroxide catalysts and fillers; and the phenol formaldehyde casting resins with fillers. The group of thermosetting resins, marketed commercially by the Bakelite Division of Union Carbide & Carbon Corporation under the trade designation of C–8 resins were found to include a resin that was ideally suited for use as the resinous ingredient in the proposed composition, while the "Epon" resins marketed commercially by Shell Chemical Corp. are likewise believed adaptable to the present invention. The specific C–8 resin found to be most effective is a liquid resin designated only by the Bakelite catalogue nomenclature as Bakelite RR 18794 resin. This resin is one of the poly epoxy casting resins and, although the exact formulation thereof is not known to the applicants, it is believed to be a reaction product prepared from the reaction of epichlorohydrin with poly-phenol, as for example bis-phenol. This resin when mixed with selected primary and secondary amine hardeners or reactants and a suitable filler all in the specific proportions hereinafter noted was found to produce a new composition of matter that possessed all the attributes and requisite properties necessary to meet the requirements heretofore enumerated for the proposed composition. While many suitable hardeners, reactants or cross-linking agents may, of course, be used the compounds marketed commercially by the Bakelite Division of the Union Carbide and Carbon Corp. and known by the trade designations of Bakelite RR 18796 and Bakelite RR 18803 for the primary and secondary amines, respectively, were found to be highly effective when used with the aforementioned Bakelite C–8 resin RR 18794. The fillers, which preferably are of the inert variety, may include either a sand, an aluminum oxide or a mica product.

One composition that was found to be highly effective for purposes of the present invention was formulated by utilizing a blend or mixture, by weight, of the particular ingredients in the following proportions:

75 parts of a diglycidyl ether
25 parts of a mixture of secondary amines
3 parts of a mixture of primary amines
1 part of a suitable color pigment
65 parts of a filler material The epoxy-type resinous material utilized in this instance was the resin product designated as Bakelite RR 18794, the secondary amines the hardener product designated as Bakelite RR 18803, the primary amines the hardener product designated as Bakelite RR 18796, the color pigments metallic oxides or carbon black, while the inert filler in this particular mixture was sand.

In applying the teachings of the present invention it has been found that the preparation of the new composition requires certain procedural operations and controls which are highly critical to the successful formulation of a satisfactory sealing and covering material, and these specific operations will now be more fully described.

After the base-supporting member 20 has been suitably secured in position between the cabinet wall members, with the layer of decorative material 26 thereon when such material is employed, and the edge molding members 23 and 24 affixed over the respective wall members 12 and 13 of said cabinet, the assembly is preheated by any suitable means such as infrared lamps or electrical resistance heating rods (not shown). In this preheating operation it is desirable that a major portion of the heat be directed to the breaker strip assembly and to the immediately adjoining portions of the cabinet side wall members 12 and 13 since these are the surfaces that co-operate to form a mold to retain the fluid-like sealing and covering material and that will come into direct contact with said material when it is poured thereinto and subsequently during the curing while in said mold. It has also been found desirable, because of the more rapid heat dissipating characteristics thereof, to have the temperature of the metal in said adjoining metallic side wall members preheated to a temperature 10° to 30° F. higher than that of the rigid base-supporting member 20, which, preferably, is preheated to a temperature in the neighborhood of 240° F. to 285° F.

During the preheating of the cabinet assembly the secondary amines (Bakelite product RR 18803) and the primary amines (Bakelite product RR 18796) may be mixed together, by utilizing some suitable mixing means such as a conventional stirring motor, and after the blending thereof is effected the mixture is subjected to a vacuum of the order of 5 millimeters of mercury, for a period of time that may vary from several minutes to one hour depending upon the moisture content, so as to remove any air bubbles or moisture therefrom. Since the moisture which the amines normally absorb may be very detrimental to the final cured resin, by way of producing surface blemishes and the like, it is important that such moisture be removed before further processing. Next, the epoxy resin (Bakelite product RR 18794) is mixed and blended with a suitable filler, such as sand, while said material is held at a temperature approximating 250° F. and, after blending is effected, the mixture is maintained at this temperature for several minutes so as to remove any air bubbles therefrom. This latter blending operation, preferably, is carried out simultaneously with that of the previous amines blending step so as to best co-ordinate these two preparatory mixing and blending operations. Now both the amines mixture and the resin-filler mixture are heated to a temperature approximating 140 degrees F. and thereafter mixed and blended together, by any suitable means such as a conventional propeller-type mixer or the like, for a period of from three to ten minutes depending upon the time necessary to effect a complete blending. During this blending period the mixing should be so controlled that there is no drawing of the liquid into a vortex adjacent the stirrer, thereby avoiding the introduction of air into the mixture. After the two mixtures have been thoroughly mixed and blended together, the resultant resinous product is poured in a relatively thin ribbon-like strip or layer over and adjoining the area of the breaker strip. The pouring, preferably, should be accomplished in one pour and hence, the width and thickness of the material laid down should be gauged so as to properly fill the space above the base-supporting member 20 and between the wall members 12 and 13 in this initial pour, thereby avoiding the necessity for subsequent touching-up of scars or blemishes in the surface thereof. When a coloring pigment or a dye is used, in lieu of a separate layer of decorative material, such coloring ingredient may be added either to the base resin, or to the resin and catalyst mixture just prior to final mixing.

Since the epoxy resin-amines combination is exothermic, a reaction starts with the beginning of the mixing and blending of the amines mixture with that of the resin and proceeds slowly throughout the mixing and subsequent curing cycles. After the composition is poured it may be cured either with or without the application of external heat. If no external curing heat is used, other than that employed in the preheating process, relative completion of cure may be obtained in approximately two hours, whereas if both the preheat and the cure heat are eliminated relative completion of cure may require approximately 24 hours. However, in order to accelerate the rate of cure and to reduce the time required to effect relative completion of cure, it has been found desirable to utilize a limited amount of external heat during the initial curing period. This may be accomplished by raising the temperature of the resinous composition, by any suitable external heating means such as electrical resistance rods, to a temperature between 180° and 325° F., and maintaining the material at such a temperature for a period of from 5 to 60 minutes. By way of example, a good cure for a composition having the specific proportions heretofore noted was obtained by maintaining the composition at a temperature of 235° F. for a period of 14 minutes.

After relative completion of cure the breaker strip assembly is allowed to cool naturally to a temperature approximating 170° F. after which it may be forced cooled to room temperature. The term "relative completion of cure" as used herein means that the cure has progressed as far as it will proceed at the designated cure temperature without an excessively long period of time, or as the point where the test for determination of acetone extractable matter, as prescribed by the American Society of Testing Materials, gives a result of less than 0.7%. It may also be designated in terms of hardness such, for instance, as a hardness of less than 40 on the Shore Monotron Hardness Tester with 10 kilogram pre-load and 5 millimeter steel ball followed by an additional 50 kilograms for 30 seconds. Although, as is well understood, curing will continue in an exothermic composition at a greatly reduced rate for a considerable period of time, stresses within the material will be well equalized within a period approximating one week. If desired, however, the assembly may be further processed along a production assembly line after the material has attained relative completion of cure.

The door or closure 11 is included in the drawings primarily to provide a background for the improved breaker strip construction of the present invention. Said closure may consist of a curved outer wall member 29 and a flat inner wall member 30 overlapping a flange 31 on the member 29. A resilient gasket sealing member 32 has a flanged portion 33 clamped between the flange 31 and the outer edge portion of the wall member 30. Said sealing member also includes a sealing portion 34 extending over the edge of the wall member 30 for resiliently engaging the top or upper surface 28 of the plastic sealing and covering composition 27 when the lid or door is closed. It will be understood, of course, that in practice the door or closure 11 may be filled with a suitable insulating material, such as indicated at 30a.

Figure 2:
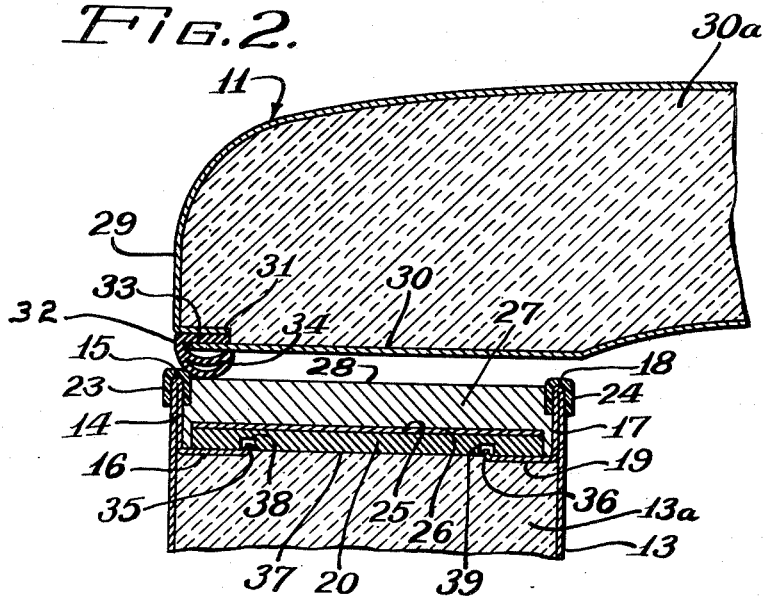
Fig. 2 is a section similar to that shown in Fig. 1 but it depicts a slightly modified arrangement for affixing the supporting base member of the breaker strip between the walls of a refrigerator cabinet.

In Fig. 2 there is illustrated another embodiment of the proposed breaker strip construction wherein the means for fixedly positioning the rigid base supporting member on the shelf-like supporting wall flanges has been slightly modified. In the proposed variation the shelf supporting flanges 16 and 19 are fashioned with their marginal edges upwardly bent at right angles to form the respective longitudinally extending lips 35 and 36. The lower or underneath surface 37, of the rigid supporting member 20, is provided with a pair of parallel, spaced apart and longitudinally extending grooves or recesses 38 and 39, inwardly spaced from the respective edges of said member, that are dimensioned and positioned to receive the lips 35 and 36 therein when said supporting base member 20 is positioned on the flanges 16 and 19. After the sealing and covering composition 27 is poured and hardened, it will also be well adhered to the support flanges 16 and 19 and to the adjacent wall members 14 and 17; hence the base member 20, in turn, will be fixedly positioned within the cabinet walls.

From the foregoing it will be apparent that the proposed improved breaker strip assembly provides a construction that is rigid, durable, easy to assemble, requires a minimum of parts, provides a minimum of heat loss and is capable of withstanding considerable abuse without suffering structural damage. Such assembly further provides an ideal and substantially permanent sealing and bonding arrangement for preventing the ingress of moisture into the insulation space between the walls of a refrigerator cabinet. Furthermore, with the construction proposed any number of plain or colored decorative combinations are possible. Further enhancement of such effects may be obtained by the use of the edging members which, additionally, serve to eliminate the unsightly appearance of the cabinet's wall edge. Since the plastic covering and sealing material incorporated herein may be poured or molded in place and then hardened therein without the aid of extraneous heat and pressure the overall cost of fabrication and assembly of a breaker strip construction is substantially reduced. A further advantage of such construction resides in the fact that corrosion of breaker strip constructions is substantially eliminated by the proposed assembly because of the use of materials therein that are not readily subject to corrosive actions.

The manner of achieving these objects and attaining these features is believed to be clear from the foregoing detailed description. Other objects and features will undoubtedly occur to those skilled in the art. Likewise certain modifications and alterations in the preferred construction disclosed may occur, all of which may be made without departing from the spirit and scope of the invention as set forth in the appended claim.

What is claimed is:

In an open top refrigerator cabinet, the combination of an outer shell forming a box-like container terminating in an open top wall, with a liner spaced from said shell and also ending in open top at substantially the same height as the shell, insulation between said liner and shell, the upper edges of said liner and shell each having a reversely turned flange lying thereagainst in the space between said liner and shell, said flanges being of substantially the same width in each case and terminating in horizontal flanges on the liner and on the shell which extend toward each other, and an upwardly turned narrow retaining flange on the free edge of each horizontal flange, a rigid base strip of insulating material having a pair of grooves in its lower face for receiving both said upwardly turned flanges, said strip closing the opening between the shell and the liner about said open top, a U-shaped non-metallic gripping molding covering and finishing the upper edges of both the shell and the liner, a layer of decorative material on said rigid strip, and a transparent layer of initially plastic pourable material located above said decorative material and extending from shell to liner below and beside said U-shaped molding, to anchor said layer in place and forming an upper hard smooth finished surface between said U moldings, while sealing the insulation between the shell and liner against ingress of moisture from the top and forming a finished breaker strip, and an insulating door closing said open top and having a resilient sealing member engaging the upper smooth surface of said breaker strip.

References Cited in the file of this patent

UNITED STATES PATENTS

| | | |
|---|---|---|
| 2,324,483 | Castan | July 20, 1943 |
| 2,464,526 | Palmer | Mar. 15, 1949 |
| 2,464,753 | Shokal et al. | Mar. 15, 1949 |
| 2,516,091 | Renaud | July 18, 1950 |
| 2,518,673 | Ellsworth | Aug. 15, 1950 |
| 2,550,493 | Ohlson | Apr. 24, 1951 |
| 2,596,573 | Luebkeman | May 13, 1952 |
| 2,644,606 | Voda et al. | July 7, 1953 |

OTHER REFERENCES

Modern Plastics, October 1952, pp. 89–94 inclusive.
Electrical Manufacturing, July 1949, pp. 78–81, 164, 166.